United States Patent [19]

Nagasaki

[11] Patent Number: 5,440,595
[45] Date of Patent: Aug. 8, 1995

[54] COMMUNICATION APPARATUS WITH LOW POWER CONSUMPTION

[75] Inventor: Kazunori Nagasaki, Tokyo, Japan

[73] Assignee: NEC Corporation, Tokyo, Japan

[21] Appl. No.: 162,274

[22] Filed: Dec. 7, 1993

[30] Foreign Application Priority Data

Dec. 7, 1992 [JP] Japan ................................. 4-326356

[51] Int. Cl.$^6$ .......................................... H04L 23/00
[52] U.S. Cl. ................................... 375/377; 375/257
[58] Field of Search ................... 375/36, 121; 455/343; 370/84, 85.9; 307/231, 296.3, 350

[56] References Cited

U.S. PATENT DOCUMENTS

4,652,875  3/1987  Waki .................... 455/343
4,893,094  1/1990  Herold et al. ................ 455/343

Primary Examiner—Stephen Chin
Assistant Examiner—Don Vo
Attorney, Agent, or Firm—Sughrue, Mion, Zinn, Macpeak & Seas

[57] ABSTRACT

A communication apparatus includes a comparator comparing the voltage at one external bus with that at another external bus, and an oscillator. The comparator has a high speed operation mode and a low speed operation mode, and the oscillator has an oscillating operation mode and a non-oscillating operation mode. A sleep signal is supplied to the communication apparatus, to put the comparator in the low speed operation mode and put the oscillator in the non-oscillating operation mode. When a fall or a rise is detected in an output of the comparator, the oscillator is changed to the oscillating operation mode, and thereafter, the comparator is changed to the high speed operation mode.

7 Claims, 9 Drawing Sheets

COMMUNICATION APPARATUS WITH LOW POWER CONSUMPTION

BACKGROUND OF THE INVENTION

1. Field of the Invention

The present invention relates to a communication apparatus connected to external buses.

2. Description of the Related Art

Generally, a plurality of communication apparatuses are connected commonly to external buses which are also connected to a central processing unit (CPU). Each of the communication apparatuses includes a comparator for comparing the voltage at one of the external buses with the voltage at another of the external buses, and an oscillator. In the prior art, the operation speed of the above-mentioned comparator has been increased while increasing the power dissipation therefor, which will be explained later in detail.

In the above-mentioned prior art communication apparatus, in a standby state where the external buses are not operating, i.e., no data transmission is being carried out on the external buses, the comparator and the oscillator are operated, thus increasing the power dissipation.

SUMMARY OF THE INVENTION

It is, therefore, an object of the present invention to provide a communication apparatus having reduced power dissipation.

According to the present invention, a communication apparatus includes a comparator for comparing the voltage at one external bus with that at another external bus and an oscillator. The comparator has a high speed operation mode and a low speed operation mode, and the oscillator has an oscillating operation mode and a non-oscillating operation mode. A sleep signal is supplied to the communication apparatus, to put the comparator in the low speed operation mode and put the oscillator in the non-oscillating operation mode. When a fall or a rise is detected in an output of the comparator, the oscillator is changed to the oscillating operation mode, and thereafter, the comparator is changed to the high speed operation mode. Thus, in a standby state where the communication apparatus receives the sleep signal, since the comparator is in the low speed operation mode and the oscillator is in the non-oscillating operation mode, only a little power dissipation is required in the comparator and the oscillator. In such a standby state, when the output of the comparator is changed, the oscillator automatically returns to the oscillating operation mode, and also the comparator automatically returns to the high speed operation mode, so that the communication apparatus is released from the standby state.

BRIEF DESCRIPTION OF THE DRAWINGS

The present invention will be more clearly understood from the description as set forth below, in comparison with the prior art, with reference to the accompanying drawings, wherein.

DESCRIPTION OF THE PREFERRED EMBODIMENTS

Before the description of embodiments of the present invention, a prior art communication apparatus will be explained with reference to FIGS. 1, 2 and 3.

Figure 1:
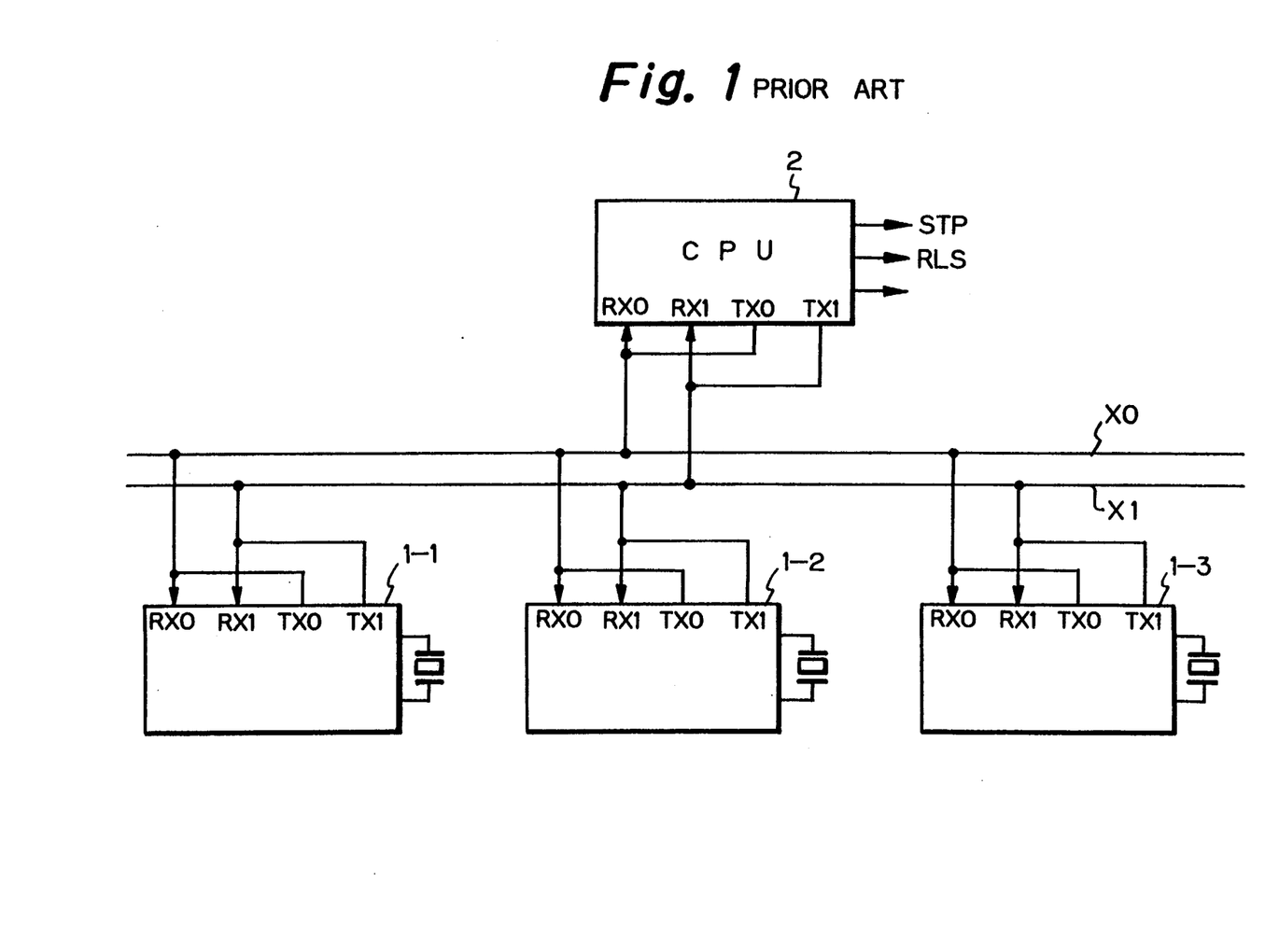
FIG. 1 is a block circuit diagram illustrating a general communication system.

In FIG. 1, which illustrates a general communication system, three communication apparatuses 1-1, 1-2 and 1-3 are connected to external buses X0 and X1 which are also connected to a CPU 2. Each of the communication apparatuses 1-1, 1-2 and 1-3 as well as the CPU 2 has receiving terminals RX0 and RX1 for receiving data from the external buses X0 and X1, and transmitting terminals TX0 and TX1 for transmitting data to the external buses X0 and X1. The CPU 2 generates various control signals such as a stop signal STP, a release signal RLS, and the like, and transmits them to the communication apparatuses 1-1, 1-2 and 1-3.

Figure 2:
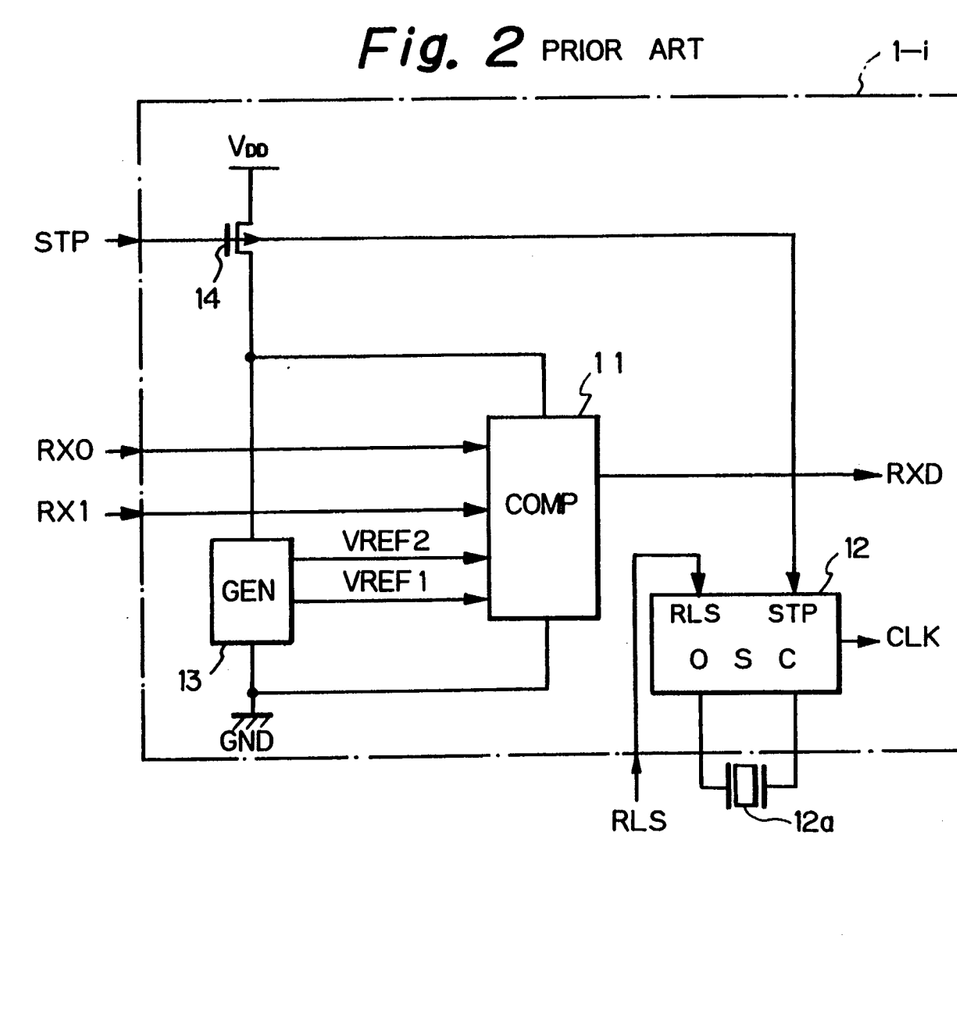
FIG. 2 is a circuit diagram illustrating a prior art communication apparatus.
Figure 3:
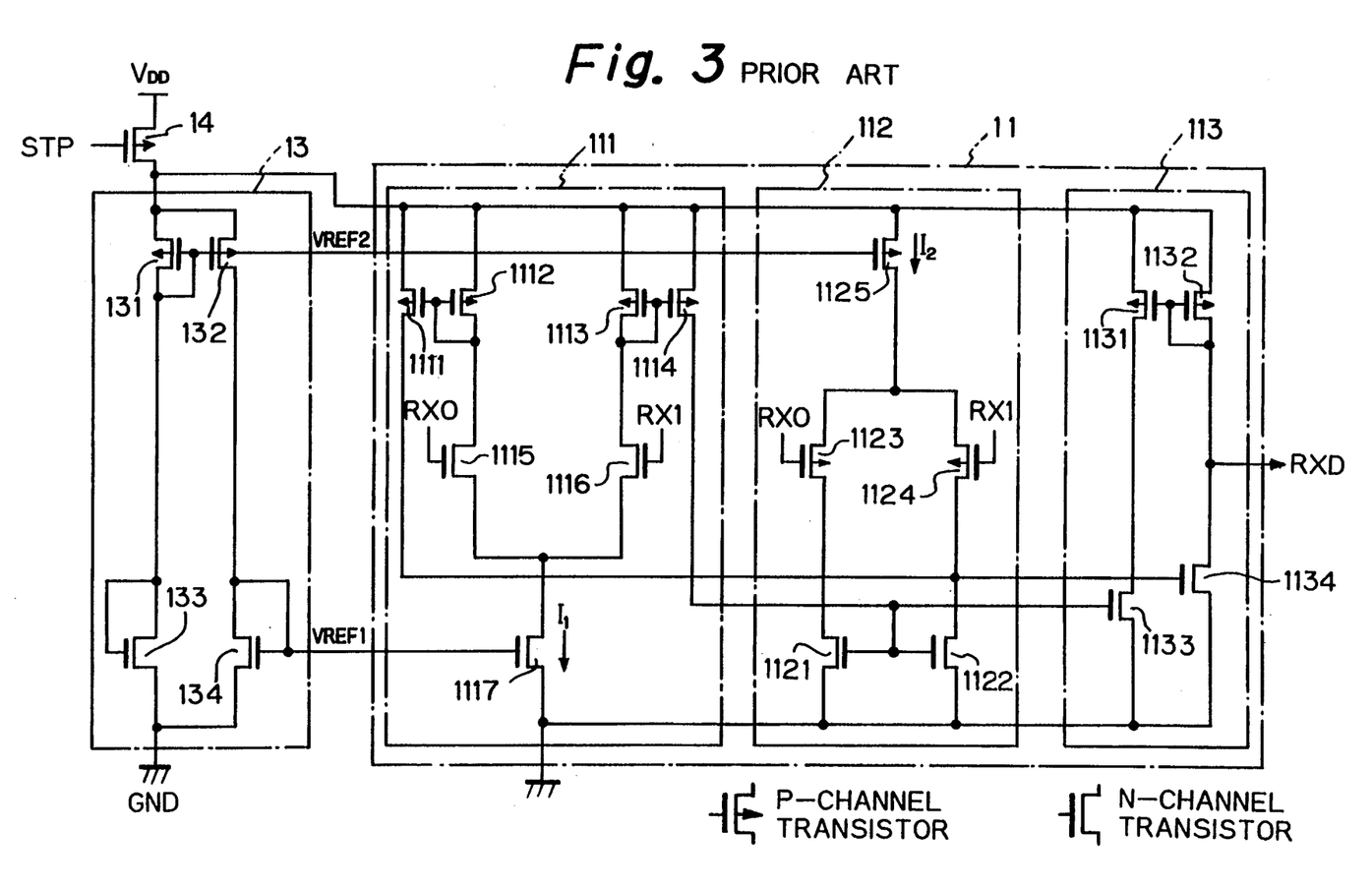
FIG. 3 is a detailed circuit diagram of the comparator and the voltage generator of FIG. 2.

In FIG. 2, which is a detailed circuit diagram of the communication apparatus 1-i (i=1, 2, 3) of FIG. 1, the apparatus 1-i includes a comparator 11 for comparing the voltage RX0 at the external bus X0 with the voltage RX1 at the external bus X1, an oscillator 12 having a crystal resonator 12a, a voltage generator 13 for generating definite reference voltages VREF1 and VREF2, and a P-channel MOS transistor 14.

The comparator 11 incorporates two differential amplifiers (current switches) for comparing the voltage RX0 with the voltage RX1. Each of the differential amplifiers receives the definite voltages VRF. F0 and VREF1, respectively, which will be explained with reference to FIG. 3.

The oscillator 12 has a stop terminal STP and a release terminal RST. When a high voltage (="1") is applied to the stop terminal STP, the oscillator 12 enters the non-oscillating operation mode, thus stopping the generation of a clock signal CLK. On the other hand, when a high voltage (="1") is applied to the release terminal RE, the oscillator 12 enters the oscillating operation mode, thus initiating generation of the clock signal CLK. Note that the clock signal CLK is supplied to various portions of the communication apparatus 1-i.

The power of the comparator 11 is turned ON and OFF by the transistor 14 upon receipt of the stop signal STP from the CPU 2. On the other hand, the power of the oscillator 12 is turned OFF by receiving the stop signal STP, while the power of the oscillator 12 is turned ON by receiving the release signal RLS from the CPU 2. That is, in a stop mode where the stop signal STP is high ("1"), the comparator 11 and the oscillator 12 are inactive, while, in a non-stop mode where the stop signal is low ("0"), the comparator 11 is active, and also, the oscillator 12 is active upon receipt of the release signal In FIG. 3, which is a detailed circuit diagram of the compartor 11 and the voltage generator 13, the voltage generator 13 includes two P-channel MOS transistors 131 and 132 forming a current mirror circuit, and two drain-gate connected N-channel MOS transistors 133 and 134. In this case, the reference voltages VREF1 and VREF2 are definite.

The comparator 11 includes a differential amplifier 111 for amplifying the difference between the voltages RX0 and RX1, a differential amplifier 112 for amplifying the difference between the voltage RX0 and RX1, and an output buffer 113, connected to the differential amplifiers 111 and 112, for generating an output signal RXD which is transmitted to an internal transmission/-reception circuit (not shown).

The differential amplifier 111 includes two P-channel MOS transistors 1111 and 1112 forming a current mirror circuit, two P-channel MOS transistors 1113 and 1114 forming a current mirror circuit, two N-channel MOS transistors 1115 and 1116 connected to the transistors 1112 and 1113, respectively, and an N-channel MOS transistor 1117 connected to the transistors 1115 and 1116. In this case, the transistor 1117 serves as a circuit source $I_1$ whose value is determined by the definite reference voltage VREF1.

Similarly, the differential amplifier 112 includes two N-channel MOS transistors 1121 and 1122 forming a current mirror circuit, two P-channel MOS transistors 1123 and 1124 connected to the transistors 1121 and 1122, respectively, and a P-channel MOS transistor 1125 connected to the transistors 1123 and 1124. In this case, the transistor 1125 serves as a circuit source $I_2$ whose value is determined by the definite reference voltage VREF2.

Also, the output buffer 113 includes two P-channel MOS transistors 1131 and 1132 forming a current mirror circuit, and two N-channel MOS transistors 1133 and 1134 for receiving the outputs of the differential amplifiers 111 and 112.

When the voltage RX0 is higher than the voltage RX1, the comparator 11 of FIG. 3 operates as follows. In the differential amplifier 111, which serves as a current switch, the transistor 1115 is turned ON and the transistor 1116 is turned OFF. As a result, a current is supplied from the transistor 111 to the gate of the transistor 1134 of the output buffer 113, while very little current is supplied to the gate of the transistor 1133. Similarly, in the differential amplifier 112, which serves as a current switch, the transistor 1124 is turned ON and the transistor 1123 is turned OFF. As a result, a current is supplied from the transistor 1125 via the transistor 1124 to the gate of the transistor 1134 of the output buffer 113, while very little current is supplied to the gate of the transistor 1133. Thus, the output signal RXD becomes low (="0").

When the voltage RX0 is lower than the voltage RX1, the comparator 11 of FIG. 3 operates as follows. In the differential amplifier 11i, the transistor 1116 is turned ON and the transistor 1115 is turned OFF. As a result, a current is supplied from the transistor 114 to the gate of the transistor 1133 of the output buffer 113, while very little current is supplied to the gate of the transistor 1134. Similarly, in the differential amplifier 112, the transistor 1123 is turned ON and the transistor 1124 is turned OFF. As a result, a current is supplied from the transistor 1125 via the transistor 1123 to the gate of the transistor 1133 of the output buffer 113, while very little current is supplied to the gate of the transistor 1134. Thus, the output signal RXD becomes high (="1").

In order to enhance the speed of the comparator 11, at least one of the value of the current source $I_1$ and the value of the current source $I_2$ is increased. For example, if the conductivity of the transistor 133 of the voltage generator 13 is made large to thereby increase the current flowing through the transistor 132 as well as the current flowing through the transistor 131, the reference voltage VREF1 is increased so as to increase the value of the current source $I_1$ and the voltage VREF2 is decreased so as to increase the value of the current source $I_2$. Thus, the operation speed of the differential amplifiers 111 and 112 is increased, i.e., the operation speed of the comparator 11 is increased.

In the above-mentioned prior art communication apparatus of FIG. 2, however, as stated above, in a standby state where the external buses X0 and X1 are not operated, the currents $I_1$ and $I$·flowing through the differential amplifiers 111 and 112 are very large, in the same way as in a non-standby state, thus increasing the power dissipation. Also, in this standby state, since the oscillator 12 is also operated, the power dissipation is further increased.

Figure 4:
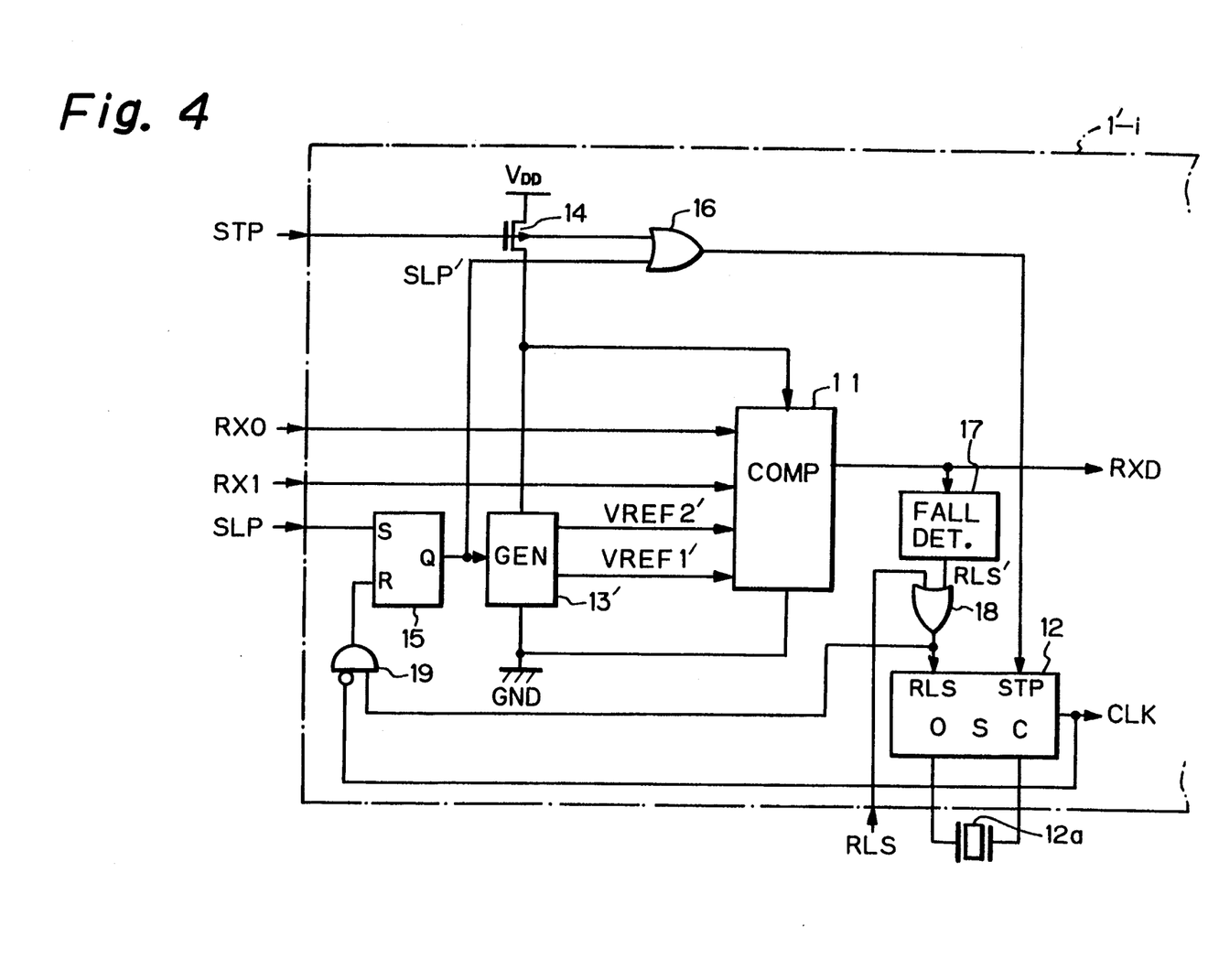
FIG. 4 is a circuit diagram illustrating a first embodiment of the communication apparatus according to the present invention.
Figure 5:
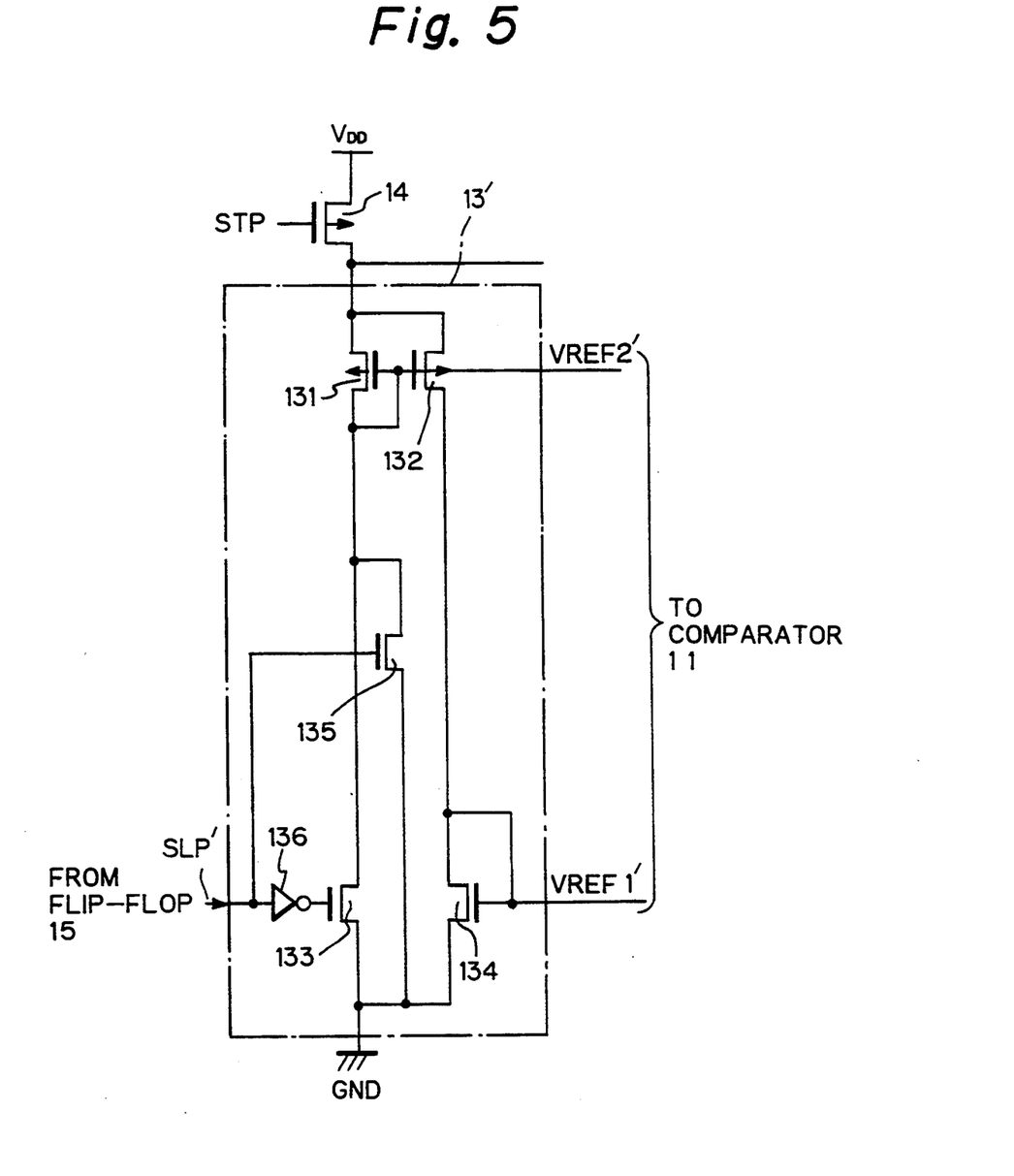
FIG. 5 is a detailed circuit diagram of the voltage generator of FIG. 4.

In FIG. 4, which illustrates a first embodiment of the present invention, a communication apparatus 1'-i includes a voltage generator 13' for generating variable reference voltages VREF1' and VREF2' instead of the voltage generator 13 of FIG. 2. That is, as illustrated in FIG. 5, the voltage generator 13' includes an N-channel MOS transistor 135 and an inverter 136 in addition to the elements of the voltage generator 13 of FIG. 3. In this case, the conductivity of the transistor 135 is less than that of the transistor 133. For example, the ratio W/L (W is a gate width; L is a gate length) of the transistor 135 is smaller than that of the transistor 133. Therefore, when an input signal SLP' is low (="0"), the transistor 133 is turned ON and the transistor 135 is turned OFF, and as a result, the voltage generator 13' operates approximately in the same way as the voltage generator 13. Thus, $$\text{VREF1}' \approx \text{VREF1} \quad (1)$$

$$\text{VREF2}' \approx \text{VREF2} \quad (2)$$

Therefore, the comparator 11 is in a high speed operation mode. On the other hand, when the input signal SLP' is high (="1"), the transistor 135 is turned ON and the transistor 133 is turned OFF. As a result, since currents flowing through the transistors 131 and 132 are decreased, the reference voltage VREF1' becomes lower than VREF1 and the reference voltage VREF2' becomes higher than VREF2. Thus, $$\text{VREF1}' < \text{VREF1} \quad (3)$$

$$\text{VREF2}' > \text{VREF2} \quad (4)$$

Therefore, the values of the current sources $I_1$ and $I_2$ are decreased so that the comparator 11 is in a low speed operation mode.

Returning to FIG. 4, a flip-flop 15, an OR circuit 16, a fall detector 17, an OR circuit 18, and a gate circuit 19 are added to the elements of FIG. 2. The flip-flop 15 is set by receiving a sleep signal SLP from the CPU2 or the like. The OR circuit 16 passes an output signal of the flip-flop 15, i.e., the input signal SLP' of the voltage generator 13' to the stop terminal STP of the oscillator 12. The fall detector 17 detects a fall in the output signal RXD of the comparator 11, to thereby generate a signal RLS' having a definite time period. The fall detector 17 may be formed by a monostable multivibrator. The OR circuit 18 passes the signal RLS' as well as the release signal RLS to the release terminal RLS of the oscillator 12 and to the gate circuit 19. The flip-flop 15 is reset by the gate circuit 19 when the output of the OR circuit is high (="1") and the oscillator 12 is in the oscillating operation mode, i.e., the clock signal CLK of the oscillator 12 is low (="0").

Figure 6A:
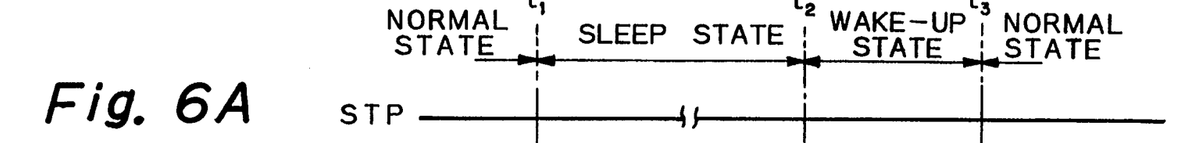
FIGS. 6A through 6H are timing diagrams showing the operation of the communication apparatus of FIG. 4.

The operation of the communication apparatus of FIG. 4 will be explained with reference to FIGS. 6A through 6H. As shown in FIG. 6A, it is assumed that the stop signal STP is always low (="0"), so that the comparator 11, the voltage generator 13' and the OR circuit 16 are active. Also, it is assumed that the flip-flop 15 is initially reset and the oscillator 12 is in an oscillating operation mode.

Before time $t_1$, since the flip-flop 15 is being reset, the input signal SLP' is low (="0"), so that the voltages VREF1' and VREF2' of the voltage generator 13' equal VREF1 and VREF2, respectively, the comparator 11 is in a high speed operation mode. Also, in this case, as stated above, the oscillator 12 is in an oscillating operation mode. This is called a normal state.

Figure 6B:
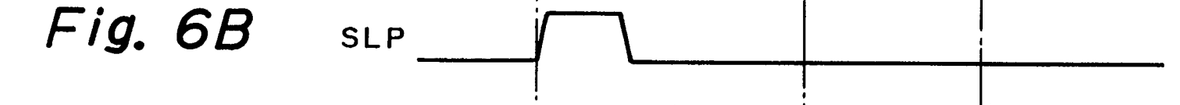
Figure 6C:
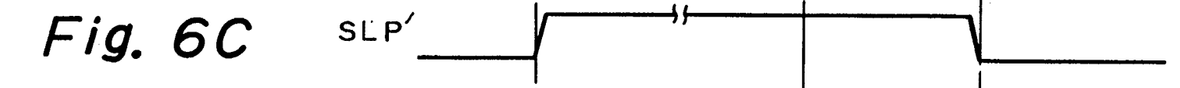

At time $t_1$, when the flip-flop 15 is set by receiving a sleep signal SLP as shown in FIG. 6B from the CPU 2 or the like, the communication apparatus 1'-i enters a sleep state, i.e., a standby mode state. That is, as shown in FIG. 6C, the output SLP' of the flip-flop 15 is changed from "0" to "1", and as a result, as shown in FIG. 6H, the oscillator 12 enters a non-oscillating operation mode. Simultaneously, the reference voltages VREF1' and VREF2' of the voltage generator 13' satisfy the formulae (3) and (4), so that the comparator 11 enters in a low speed operation mode. Thus, the power dissipation of the communication apparatus 1'-i is reduced.

Figure 6D:
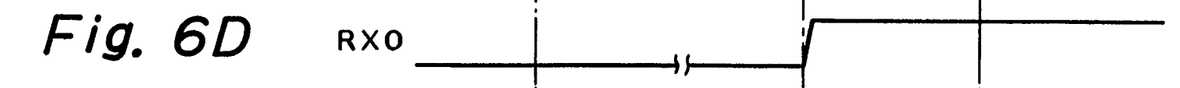
Figure 6E:
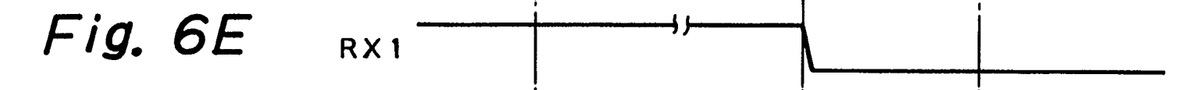
Figure 6F:
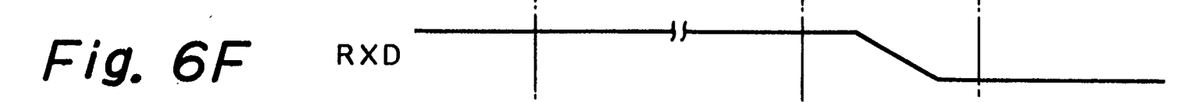
Figure 6G:
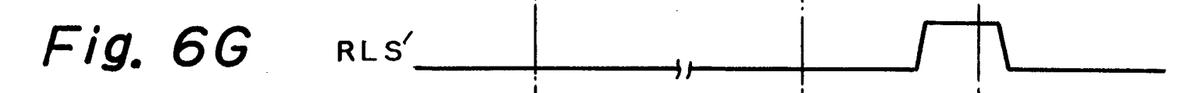
Figure 6H:
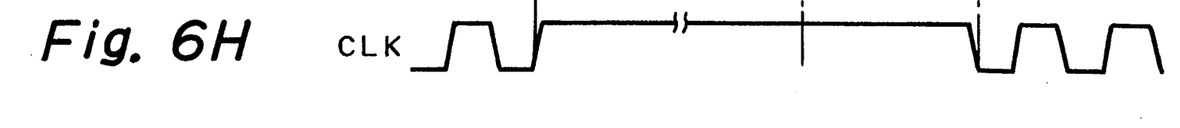

At time $t_2$, when the voltage RX0 at the external bus X0 is switched from low (="0") to high (="1") as shown in FIG. 6D and the voltage RX1 at the external bus X1 is switched from high (="1") to low (="0"), as shown in FIG. 6E, the output RXD of the comparator 11 is switched from high (="1") to low (="0") as shown in FIG. 6F. In this case, the change of the output RXD of the comparator 11 is slow due to the low speed operation mode thereof. This change is detected by the fall detector 17 which, in turn, generates a signal RLS' as shown in FIG. 6G.

The signal RLS' is supplied as a release signal to the release terminal RLS of the oscillator 12, so that, at time $t_3$, the oscillator 12 enters an oscillating operation mode. Simultaneously, the gate circuit 19 generates a high level signal to reset the flip-flop 15. Thus, the voltages VREF1' and VREF2' of the voltage generator 13' satisfy the formulae (1) and (2), and accordingly, the comparator 11 returns to a high speed operation mode.

Note that a transition time period from time $t_2$ to time $t_3$ is defined as a wake-up state switched from the sleep state to the normal state. In this case, the delay time of the comparator 11 in a low speed operation mode is not so large, so that the wake-up time period is less than a one-bit transfer time period, thus avoiding incomplete reception of data.

Figure 7:
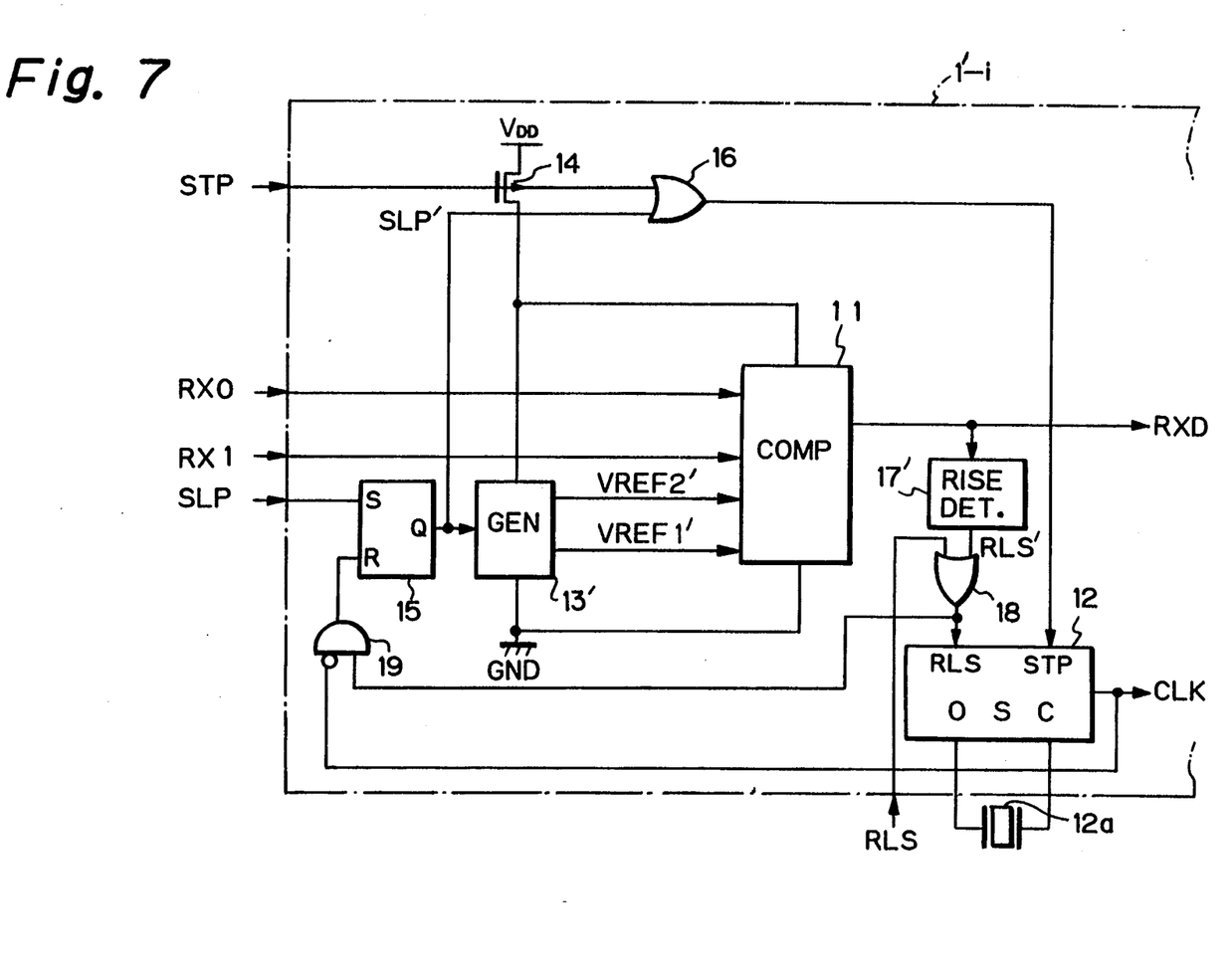
FIG. 7 is a circuit diagram illustrating a second embodiment of the communication apparatus according to the present invention.

In FIG. 7, which illustrates a Second embodiment of the present invention, a rise detector 17' is provided instead of the fall detector 17 of FIG. 4. Therefore, when a rise occurs in the output of the comparator 11, the communication apparatus 1'-i of FIG. 7 is woke up from a sleep state to return to a normal state.

Figure 8:
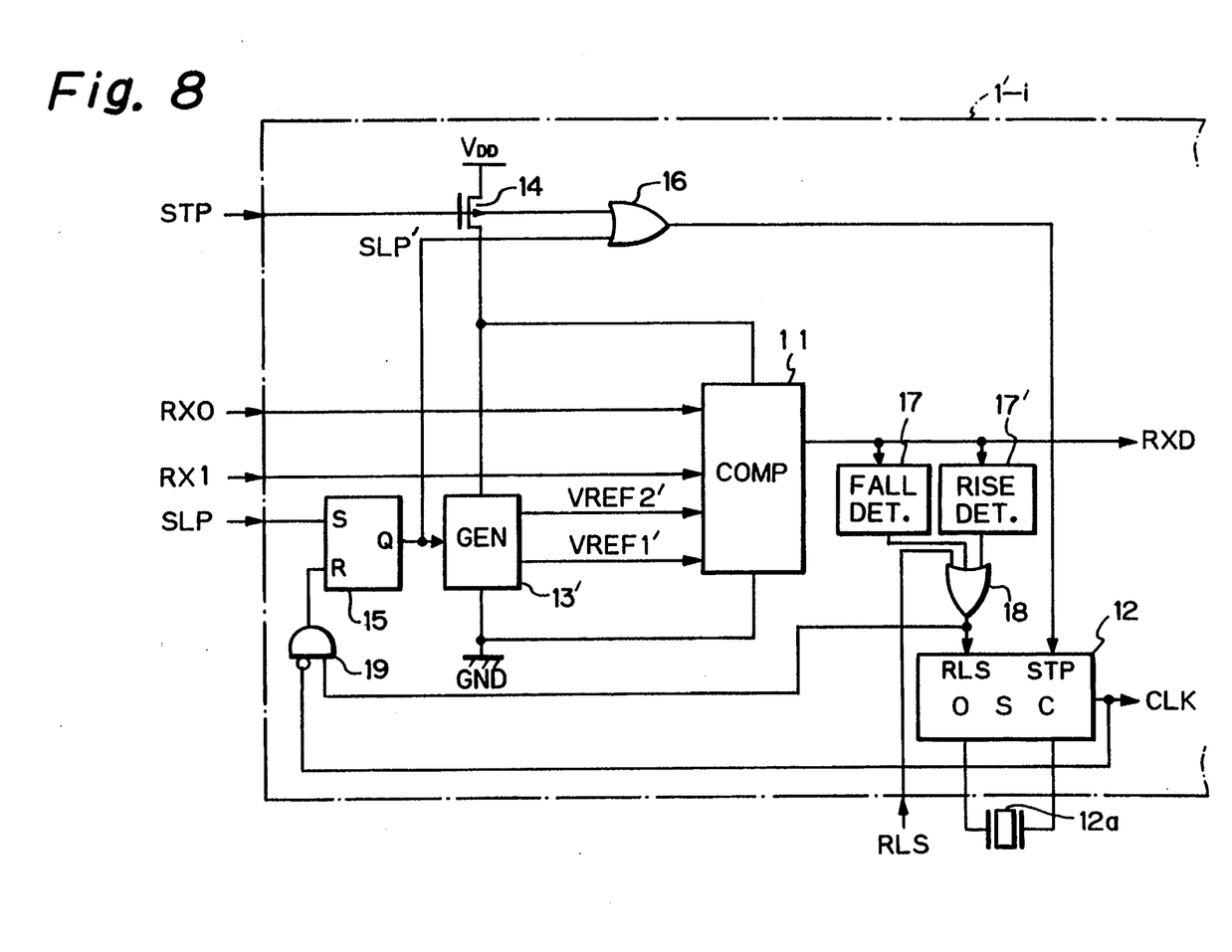
FIG. 8 is a circuit diagram illustrating a third embodiment of the communication apparatus according to the present invention.

In FIG. 8, which illustrates a third embodiment of the present invention, a rise detector 17' added to the elements of FIG. 4. Therefore, when a fall or a rise occurs in the output of the comparator 11, the communication apparatus 1'-i of FIG. 8 is woke up from a sleep state to return to a normal state.

Figure 9:
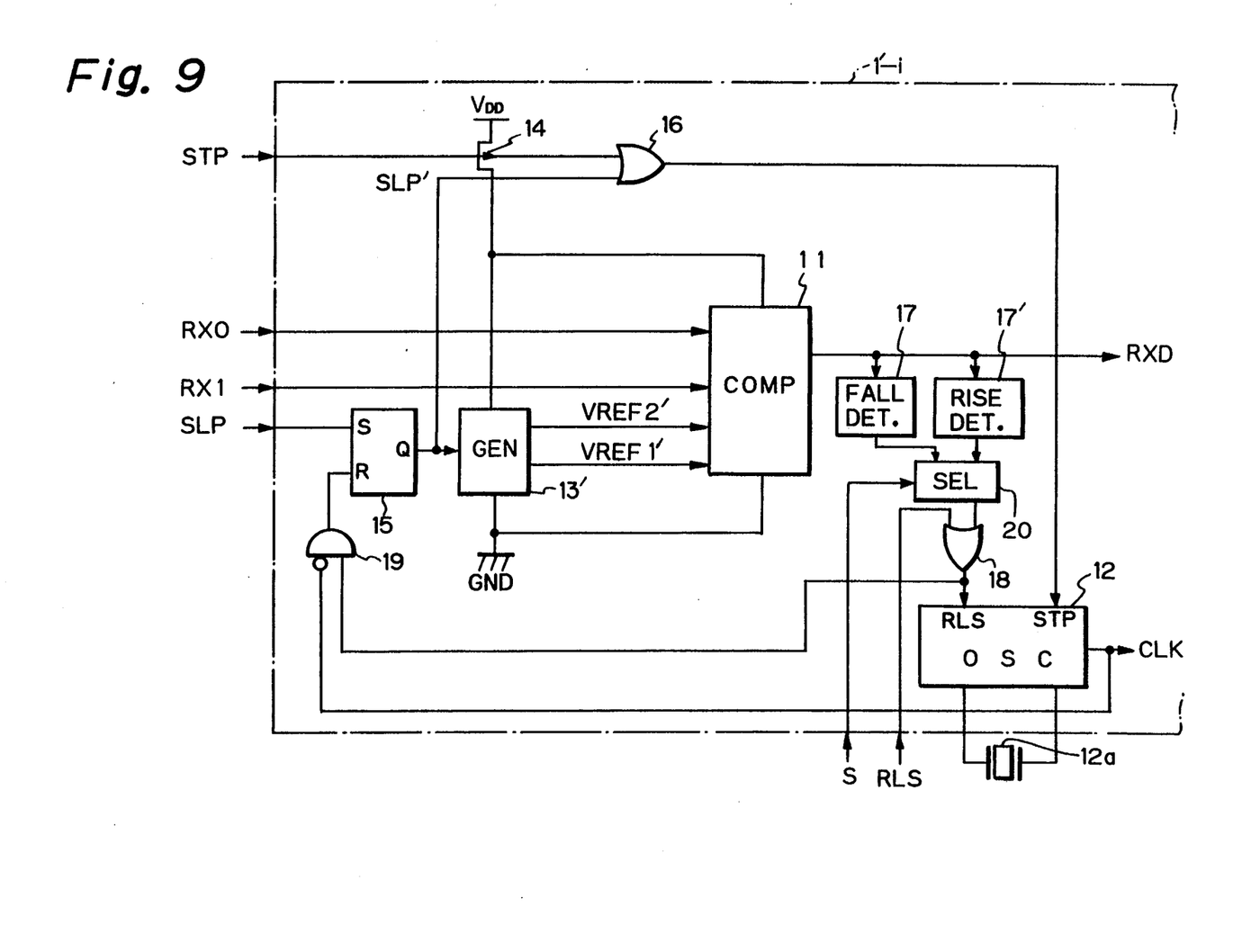
FIG. 9 is a circuit diagram illustrating a fourth embodiment of the communication apparatus according to the present invention.

In FIG. 9, which illustrates a fourth embodiment of the present invention, a selector 20 is interposed between the outputs of the fall detector 17 and the rise detector 17' and the input of the OR circuit 18 in FIG. 8. The selector 20 is set in advance by a select signal S from the CPU 2 or the like. If the selector 20 selects the output of the fall detector 17, the communication apparatus of FIG. 9 operates in the same way as the communication apparatus of FIG. 4. Conversely, if the selector 20 selects the output of the rise detector 17', the communication apparatus of FIG. 9 operates in the same way as the communication apparatus of FIG. 7.

In the above-mentioned embodiments, the comparator 11 includes two-stage differential amplifiers (current switches); however, the present invention can be applied to a comparator having a single differential amplifier (current switch).

As explained hereinbefore, according to the present invention, since a sleep operation mode is introduced in the communication apparatus, the power dissipation thereof can be reduced.

I claim:

1. A communication apparatus connected to a plurality of external buses, comprising:
   a comparator, connected to said external buses, for comparing the voltage at one of said external buses with that at another of said external buses to generate an output signal, said comparator having a high speed operation mode and a low speed operation mode;
   an oscillator having an :oscillating operation mode and a non-oscillating operation mode;
   sleeping means, connected to said comparator and said oscillator, for putting said comparator in the low speed operation mode and for putting said oscillator in the non-oscillating mode;
   detecting means, connected to an output of said comparator, for detecting at least one of a fall and a rise in a voltage of the output signal thereof to put said oscillator in the oscillating operation mode; and
   resetting means, connected to said detecting means, said oscillator, and said sleeping means, for resetting said sleeping means when said detecting means detects at least one of a fall and a rise in the voltage of the output signal of said comparator and said oscillator is in the oscillating operation mode.

2. An apparatus as set forth in claim 1, wherein said comparator comprises a current switch for receiving the voltages at said two external buses, and a current source connected to said current switch,
   said current source being controlled by said sleeping means, so that a current flowing through said current source is larger in the high speed operation mode than in the low speed operation mode.

3. A communication apparatus as set forth in claim 2, wherein said sleeping means includes a voltage generator for generating a voltage whose value is varied in accordance with the operation of said sleeping means and applying this voltage to said current source, thus controlling said current source.

4. A communication apparatus connected to two external buses, comprising:

a flip-flop set by receiving a sleep signal;

a voltage generator, connected to an output of said flip-flop, for generating a first voltage when said flip-flop is reset and generating a second voltage when said flip-flop is set;

a comparator, connected to said external buses and said voltage generator, for comparing the voltage at one of said external buses with the voltage at the other of said external buses to generate an output signal, said comparator having a high speed operation mode when receiving the first voltage from said voltage generator and a low speed operation mode when receiving the second voltage from said voltage generator;

an oscillator connected to said flip-flop, said oscillator being in a non-oscillating operation mode when said flip-flop is set;

a fall detector, connected to an output of said comparator, for detecting a fall in the output signal to generate a release signal for putting said oscillator in an oscillating operation mode;

a gate circuit, connected to said fall detector, said oscillator, and said flip-flop, for resetting said flip-flop when said release signal is generated from said fall detector and said oscillator is in the oscillating operation mode.

5. A communication apparatus connected to two external buses, comprising:

a flip-flop set by receiving a sleep signal;

a voltage generator, connected to an output of said flip-flop, for generating a first voltage when said flip-flop is reset and generating a second voltage when said flip-flop is set;

a comparator, connected to said external buses and said voltage generator, for comparing the voltage at one of said external buses with the voltage at the other of said external buses to generate an output signal, said comparator having a high speed operation mode when receiving the first voltage from said voltage generator and a low speed operation mode when receiving the second voltage from said voltage generator;

an oscillator connected to said flip-flop, said oscillator being in a non-oscillating operation mode when said flip-flop is set;

a rise detector, connected to an output of said comparator, for detecting a rise in the output signal to generate a release signal for putting said oscillator in an oscillating operation mode;

a gate circuit, connected to said rise detector, said oscillator, and said flip-flop, for resetting said flip-flop when said release signal is generated from said rise detector and said oscillator is in the oscillating operation mode.

6. A communication apparatus connected to two external buses, comprising:

a flip-flop set by receiving a sleep signal;

a voltage generator, connected to an output of said flip-flop, for generating a first voltage when said flip-flop is reset and generating a second voltage when said flip-flop is set;

a comparator, connected to said external buses and said voltage generator, for comparing the voltage at one of said external buses with the voltage at the other of said external buses to generate an output signal, said comparator having a high speed operation mode when receiving the first voltage from said voltage generator and a low speed operation mode when receiving the second voltage from said voltage generator;

an oscillator connected to said flip-flop, said oscillator being in a non-oscillating operation mode when said flip-flop is set;

a fall detector, connected to an output of said comparator, for detecting a fall in the output signal to generate a release signal for putting said oscillator in an oscillating operation mode;

a rise detector, connected to the output of said comparator, for detecting a rise in the output signal to generate the release signal for putting said oscillator in the oscillating operation mode;

an OR circuit connected to said fall detector and said rise detector;

a gate circuit, connected to said OR circuit, said oscillator and said flip-flop, for resetting said flip-flop when said release signal is outputted from said OR circuit and said oscillator is in the oscillating operation mode.

7. A communication apparatus connected to two external buses, comprising:

a flip-flop set by receiving a sleep signal;

a voltage generator, connected to an output of said flip-flop, for generating a first voltage when said flip-flop is reset and generating a second voltage when said flip-flop is set;

a comparator, connected to said external buses and said voltage generator, for comparing the voltage at one of said external buses with the voltage at the other of said external buses to generate an output signal, said comparator having a high speed operation mode when receiving the first voltage from said voltage generator and a low speed operation mode when receiving the second voltage from said voltage generator;

an oscillator connected to said flip-flop, said oscillator being in a non-oscillating operation mode when said flip-flop is set;

a fall detector, connected to an output of said comparator, for detecting a fall in the output signal to generate a release signal for putting said oscillator in an oscillating operation mode;

a rise detector, connected to the output of said comparator, for detecting a rise in the output signal to generate the release signal for putting said oscillator in the oscillating operation mode;

a selector, connected to said fall detector and said rise detector, for selecting one of said fall detector and said rise detector;

a gate circuit, connected to said selector, said oscillator and said flip-flop, for resetting said flip-flop when said release signal is received from said selector and said oscillator is in the oscillating operation mode.

* * * * *

UNITED STATES PATENT AND TRADEMARK OFFICE
CERTIFICATE OF CORRECTION

PATENT NO.   : 5,440,595
DATED        : August 8, 1995
INVENTOR(S)  : Kazunori NAGASAKI It is certified that error(s) appears in the above-identified patent and that said Letters Patent is hereby corrected as shown below:

Col. 2, line 56, delete "RE" and insert --RLS--.

Col. 3, line 3, after "signal" insert --RLS--.

Col. 3, line 61, delete "11i" and insert --111--.

Col. 4, line 22, delete "I'" and insert --$I_2$--.

Signed and Sealed this

Twenty-third Day of January, 1996

BRUCE LEHMAN

*Attest:*

*Attesting Officer*    *Commissioner of Patents and Trademarks*